United States Patent Office 2,938,832
Patented May 31, 1960

2,938,832
LAXATIVE COMPOSITION

John A. Huggins and Neil H. Mercer, Evansville, Ind., assignors to Mead Johnson & Company, Evansville, Ind., a corporation of Indiana No Drawing. Filed Feb. 7, 1956, Ser. No. 563,843

7 Claims. (Cl. 167—56)

This invention pertains to an improved laxative composition adapted to effect elimination of hardened or impacted fecal masses with a minimum of pain and discomfort.

The usual cathartic or laxative promotes bowel evacuation by irritating the lining of the intestines whereby peristaltic contractions or the wormlike wave motion of the intestines produced by successive contraction of the intestinal muscular fibers is induced. Although elimination of waste material in the intestines results because of the latter-described intestinal irritation, if the feces are hardened or impacted as a result of accumulation over a long period of time, the elimination may be painful in addition to causing damage to the lining of the rectum. Impacted feces is a common occurrence to those persons suffering, for instance, from megacolon, or enlarged colon, and bedridden patients in general, particularly those having poliomyelitis and other diseases which effect a condition of muscle weakness.

The desirability of softening the hardened fecal masses preliminarily to elimination of the same thus becomes very obvious.

It is an object of this invention, therefore, to provide a laxative composition which not only effects bowel evacuation but, in addition, softens the fecal matter preliminarily to elimination, thereby insuring a minimum of pain, discomfort and intestinal damage during the bowel movement.

It is another object of this invention to provide an improved laxative composition which is nonhabit forming and which does not result in intestinal damage even when practiced over prolonged periods of time.

It is a further object of this invention to provide an improved laxative composition which immediately commences to function in an efficient manner after administration.

It is a still further object of this invention to provide a stable laxative solution in which the effective principles thereof are maintained in constant solution even after prolonged storage.

The above and other objects of this invention will become more apparent upon proceeding with the following description and appended claims.

In accordance with one embodiment of this invention, a therapeutic composition for softening and promoting elimination of fecal material in the large intestine is provided. The therapeutic comprises a laxative adapted to induce bowel movement in the usual manner in combination with a nontoxic salt of a dialkyl sulfosuccinate. The latter sulfosuccinate acts as a penetrant which enters hardened fecal masses and enables other liquids in the intestines to subsequently enter and thereby soften the same. Thus, upon elimination of the softened feces, irritation and damage to the lining of the rectum will be absent despite the initial hardened or impacted state of the fecal matter.

It is intended that the provided composition be preferably orally administered in liquid form in a carrier liquid which may also contain flavoring matter.

In the preferred embodiment of the provided laxative composition, dioctyl sodium sulfosuccinate [bis(2-ethylhexyl)sodium sulfosuccinate] comprises the sulfosuccinate. It will be made apparent, however, that other nontoxic salts of dialkyl sulfosuccinates will work to advantage. Also, in the preferred embodiments of this invention, the positive-acting, irritant type laxative comprises a water soluble methanol extract of cascara sagrada sold by S. B. Penick and Company, under the trade name of Casanthranol. However, since Casanthranol solutions are unstable as cascara principles therein precipitate upon standing as shown in U.S. Patent 2,552,896, laxative compositions containing the material have not been entirely satisfactory. It has been found, in accordance with one embodiment of this invention, that small quantities of a nontoxic salt of a dialkyl sulfosuccinate and a nonionic surfactant prepared by condensing ethylene oxide with a hydrophobic base will impart the desired stability, as will hereinafter be explained in greater detail.

The laxative composition provided in this invention is particularly adapted for use in those cases of constipation in which severe hardening of feces or fecal constipation is present. The provided laxative composition, therefore, has particular application for those individuals suffering from megacolon or abnormally enlarged colon, bedridden patients in general, and particularly those suffering from poliomyelitis and other diseases effecting a condition of muscle weakness. However, since constipation is a condition in which evacuation of the bowels is infrequent, the accumulation in the intestine of hardened feces is usually present when a state of constipation exists. Consequently, it is intended that the composition hereinafter to be described in detail be utilized in all instances in which a therapeutic for alleviating the constipated condition is desired.

The therapeutc composition provided by the invention in its broader aspects contains two active principles. The first is a positive-acting, irritant type laxative which functions to irritate the intestine linings thereby effecting peristaltic contractions of the same or a bowel movement leading to evacuation of fecal matter contained therein. The second active principle in the therapeutic composition of this invention comprises a nontoxic salt of a dialkyl sulfosuccinate. The latter sulfosuccinates function as penetrants which penetrate hardened fecal matter and enable water and other liquids in the intestine to enter the hardened feces and soften the same. It thus becomes apparent that the fecal matter in the course of elimination from the body is in a softened state. Consequently, the bowel movement is effected with the absence of pain or discomfort, in addition to the absence of damage occuring to the rectum lining, since the fecal matter has been softened by the liquid even though it had previously been in a hardened and impacted state prior to administration of the provided laxative. It is thus seen that the laxative irritant creates or instigates the bowel movement, whereas the nontoxic dialkyl sulfosuccinate insures that the eliminated fecal matter is in a softened condition.

It is intended that the laxative composition including both the laxative irritant and the nontoxic dialkyl sulfosuccinate be orally administered in solution form. Since the sulfosuccinates above described are bitter in taste and definitely nonpalatable, flavoring matter is preferably added to the solution. It has also been found that one of the more effective irritant type laxatives for use in a therapeutic composition functioning in accordance with the principles of this invention comprises a water soluble methanol extract of cascara sagrada, available under the trade name of Casanthranol. However, it has also been found that Casanthranol solutions have inadequate stability as is evidenced by the gradual formation of resinous precipitates from such solutions upon standing. This precipitate contains some of the active principles of cascara. Consequently, before Casanthranol is incorporated in a therapeutic composition formulated in accordance with the principles of this invention, means is preferably provided which obviates this precipitation if irregular dosages of the active principles of Casanthranol are to be avoided.

Thus, it has been found that a small percentage of a nonionic surfactant prepared by condensing ethylene oxide with a hydrophobic base which is, in turn, formed by the condensation of propylene oxide with propylene glycol, when added to a solution containing both Casanthranol and dioctyl sodium sulfosuccinate (the preferred dialkyl sulfosuccinate), effected a stable solution in which no precipitation of the cascara principles resulted. The latter nonionic surfactant is odorless and tasteless and is available from Wyandotte Chemicals Corporation under the trade name of Pluronic F68. The empirical formula of this latter condensation product is $HO(C_2H_4O)_a(C_3H_6O)_b(C_2H_4O)_cH$ and its average molecular weight is about 7500, although it may vary in range between about 6000 and 9000. The ethylene oxide component of the molecule represented by the integers $a$ and $c$ is from about 10% to about 90% by weight of the polymer molecule as disclosed in "pluronics A new series of nonionic surface active agents," Wyandotte Chemicals Corporation, September 1954, and in "Presenting the Pluronics Grid," Wyandotte Chemicals Corporation, January 30, 1956. The amount of the Pluronic F68 used is suitably around 5 percent by weight of the total composition but is effective in concentrations of as low as 1 percent.

The following example pertaining to the subjoined formulations clearly illustrate the stabilizing effect of the Pluronic F68 on the Casanthranol component in the disclosed preparations.

|  | Formula A | Formula B |
| --- | --- | --- |
|  | Percent | Percent |
| Pluronic F68 | 5.0 | None |
| Dioctyl sodium sulfosuccinate | 1.0 | 1.0 |
| Casanthranol | 5.0 | 5.0 |
| Saccharin Sodium USP | 0.1 | 0.1 |
| Sorbitol Solution NF | 10.0 | 10.0 |
| Alcohol USP | 20.0 | 20.0 |
| Flavor | 0.1 | 0.1 |
| Distilled Water q.s. ad | 100.0 | 100.0 |

*Example 1*

The various components listed in Formula A were mixed and stored at: (1) room temperature in an air-conditioned room, (2) in a warehouse where conditions of heat and humidity were highly variable, and (3) at 45° C.

Formula A containing 5 percent by weight of Pluronic F68 under all three storage conditions retained its original opaque brown color with no precipitation of cascara principles occurring. Formula B, when stored under identical conditions (from which the Pluronic F68 was omitted), while still opaque and brown in color, contained a heavy precipitate of cascara principles. These precipitates were collected by filtration and responded positively to the test for emodins by the Borntraeger test.

The effectiveness of the Pluronic F68 has been made apparent in the above example. Although the preferred preparation utilizes dioctyl sodium sulfosuccinate as the desired sulfosuccinate, it is to be understood that other nontoxic salts of dialkyl sulfosuccinates such as those of potassium and ammonia will work to advantage in formulations similar to A above. In addition, the two alkyl groups need not necessarily be octyl nor contain equal numbers of carbon atoms. Thus, dialkyl sulfosuccinate salts containing alkyl groups having 5 to 10 carbon atoms are included within the ambit of this invention. Also, although Casanthranol, or a methanol extract of cascara sagrada, has been incorporated in a preferred form of the laxative composition provided by this invention, it should be understood that other cascara sagrada type laxative compositions may be stabilized by the substances above indicated. Also, in its broader aspect, the invention encompasses other laxatives or cathartics such as magnesium hydroxide, magnesium sulfate, aloin, senna, dihydroxy 1,8-dihydroxy anthraquinone (Danthrone) and phenolphthalein in conjunction with the dialkyl sulfosuccinate penetrants.

It is also apparent that sweeteners and flavoring matter other than the saccharin and sorbitol incorporated in the above formulations may be utilized.

Thus, a composition has been provided which is especially adapted for the treatment of constipation and for the alleviation of such a condition in a manner heretofore unknown in the art. The provided composition, in addition to inducing the peristaltic movements characteristic of a bowel movement, contains a penetrant which enables the hardened fecal masses in the large intestine to be softened whereby elimination may be effected with a minimum of discomfort and damage to the mucosa of the rectum. A preferred formulation has been provided in which the irritant type laxative is a water soluble methanol extract of cascara sagrada and which also incorporates a nonionic surfactant prepared by condensing ethylene oxide with a hydrophobic base formed by the condensation of propylene oxide with propylene glycol. A weight of the latter surfactant equal to that of the Casanthranol will prevent any precipitation of cascara principles from the cascara sagrada extract when the latter is in solution. The Casanthranol or other cathartic which may be used is used in quantities similar to those employed when used alone. The dioctyl sodium sulfosuccinate is preferably present in the provided formulation in 1 percent concentrations. Recommended daily dosages of the latter succinate for purposes herein claimed are: For infants 10 to 20 milligrams a day, for children 1 to 5 years 20 to 60 milligrams per day, children 6 to 12 years 60 to 90 milligrams per day, and adults 60 to 120 milligrams per day. These recommended dosages may obviously be varied in accordance with the severity of the case being treated and, also, will be qualified by the amount and kind of laxative present.

Since it has been made obvious from the above that various formulations may be prepared in accordance with the inventive principles disclosed, it is intended that this invention be limited only by the scope of the appended claims.

We claim:

1. A laxative composition comprising a nontoxic salt of a dialkyl sulfosuccinate wherein each of the alkyl groups contains from 5 to 10 carbon atoms, an extract of cascara sagrada, and a nonionic surface active agent having an average molecular weight between about 6000 and about 9000 and having the empirical formula:

$$HO(C_2H_4O)_a(C_3H_6O)_b(C_2H_4O)_cH$$

wherein $a$, $b$ and $c$ are each integers, and the combined weight of the ethylene oxide component as represented by the integers $a$ and $c$ is from 10% to 90% by weight of the polymer molecule.

2. The laxative composition recited in claim 1 wherein said extract is a water soluble methanol extract.

3. The laxative composition recited in claim 1 wherein said salt is selected from the group consisting of sodium, potassium and ammonium salts.

4. A laxative composition comprising dioctyl sodium sulfosuccinate, an extract of cascara sagrada and a nonionic surface active agent having an average molecular weight between about 6000 and about 9000 and having the empirical formula:

$$HO(C_2H_4O)_a(C_3H_6O)_b(C_2H_4O)_cH$$

wherein $a$, $b$ and $c$ are each integers, and the combined weight of the ethylene oxide component as represented by the integers $a$ and $c$ is from 10% to 90% by weight of the polymer molecule.

5. A laxative composition comprising a nontoxic salt of a dialkyl sulfosuccinate wherein each of the alkyl groups contains from 5 to 10 carbon atoms, an extract of cascara sagrada, and a nonionic surface active agent having an average molecular weight between about 6000 and about 9000 and having the empirical formula:

$$HO(C_2H_4O)_a(C_3H_6O)_b(C_2H_4O)_cH$$

wherein $a$, $b$ and $c$ are each integers, said agent being a condensation product formed by condensing ethylene oxide with the condensation product of propylene oxide and propylene glycol, and the combined weight of the ethylene oxide component represented by the integers $a$ and $c$ is from 10% to 90% by weight of the polymer molecule.

6. A laxative composition comprising dioctyl sodium sulfosuccinate, a water soluble methanol extract of cascara sagrada, and a nonionic surface active agent having an average molecular weight between about 6000 and about 9000 and having the empirical formula:

$$HO(C_2H_4O)_a(C_3H_6O)_b(C_2H_4O)_cH$$

wherein $a$, $b$ and $c$ are each integers, said agent being a condensation product formed by condensing ethylene oxide with the condensation product of propylene oxide and propylene glycol, and the combined weight of the ethylene oxide component represented by the integers $a$ and $c$ is from 10% to 90% by weight of the polymer molecule.

7. The laxative composition recited in claim 6 wherein said average molecular weight is about 7500.

References Cited in the file of this patent

Fitzhugh: J.A.P.A., vol. 37, 1948, pp. 29–32.
Pluronics (Wyandotte), Mar. 1, 1952, pp. 1, 2, 8, 10.
U.S. Disp., 24th ed., 1947, Lippincott Co., Philadelphia, Pa., pp. 233–235.